United States Patent [19]
Sperber

[11] 4,095,258
[45] June 13, 1978

[54] APPARATUS FOR DECODING SCRAMBLED TELEVISION AND SIMILAR TRANSMISSIONS

[75] Inventor: Martin Sperber, Cranford, N.J.

[73] Assignee: Blonder-Tongue Laboratories, Inc., Old Bridge, N.J.

[21] Appl. No.: 732,607

[22] Filed: Oct. 15, 1976

[51] Int. Cl.² .............................................. H04N 1/44
[52] U.S. Cl. .................................... 358/120; 358/118; 358/122
[58] Field of Search ....................... 358/118, 120, 122

[56] References Cited
U.S. PATENT DOCUMENTS

| | | | |
|---|---|---|---|
| 2,705,740 | 4/1955 | Druz | 358/120 |
| 3,081,376 | 3/1963 | Loughlin et al. | 358/120 |
| 3,184,537 | 5/1965 | Court et al. | 358/120 |
| 3,729,576 | 4/1973 | Court | 358/120 |
| 3,813,482 | 5/1974 | Blonder | 358/120 |

*Primary Examiner*—S. C. Buczinski
*Attorney, Agent, or Firm*—Rines and Rines, Shapiro and Shapiro

[57] ABSTRACT

This disclosure deals with a novel scrambled television decoding system for modulation-suppressed trains of synchronizing signals at a predetermined line rate, in which the demodulating circuits produce an advanced modulation frequency signal synchronized with a selected reference first equalizing pulse to control the gain of the received scrambled television signals and correspondingly to restore the suppressed synchronizing signals to reconstitute the unscrambled television signal.

12 Claims, 8 Drawing Figures

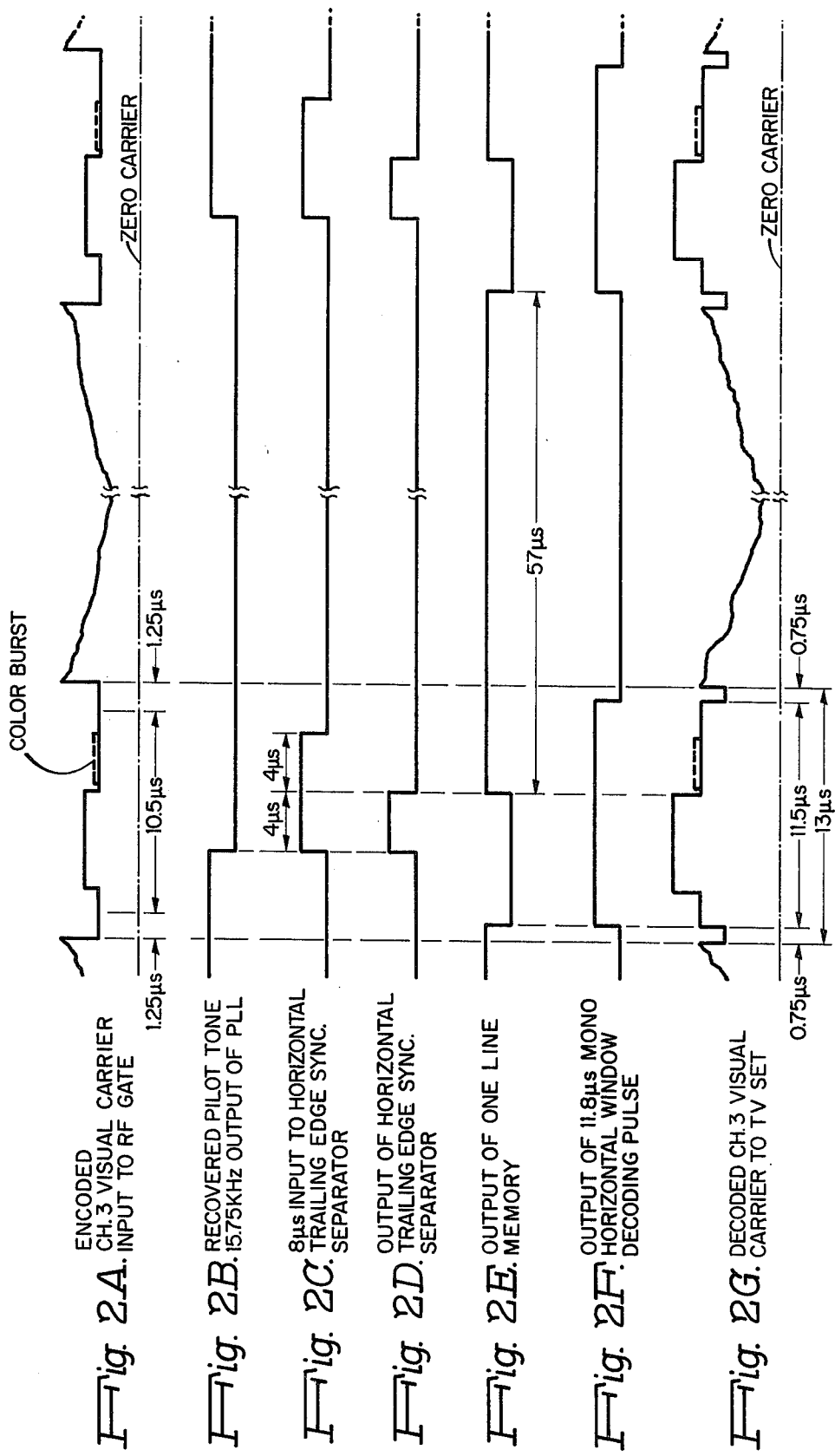

APPARATUS FOR DECODING SCRAMBLED TELEVISION AND SIMILAR TRANSMISSIONS

The present invention relates to decoding of scrambled television signals and the like, being more particularly directed to new and improved systems for receiving and decoding subscription television (STV) and related radio-frequency transmissions; and being still more particularly adapted for use with the method and apparatus described in U.S. Pat. No. 3,813,482 of Isaac S. Blonder, entitled "Method Of And Apparatus For Scrambled-Encoded Transmission And Decoded Reception For Over The Air And Cable Subscription Television And The Like", and the references cited therein.

As explained in the said Letters Patent and in the patents and FCC-maintained proprietary documents referred to therein, and incorporated herein by reference, effective scrambling of television and related transmissions may be effected in a host of ways, most of which are subject to degradation in the decoding and picture and sound restoration from the reception quality normally attainable without scrambling or decoding. In the Blonder system, on the other hand, particular types of scrambling-encoding and compatable decoding techniques are employed involving the depressing to substantially blanking level of pluralities of synchronizing ("sync") signals, and at a preferred rate of the order of 10 HZ, attaining adequate scrambling and providing psychologically unpleasant and discomforting shifting of pictures to the viewer not equipped with the appropriate decoding mechanism. Upon reception, decoding and picture sound restoration is effected with a reception quality that, even in color, remains unchanged in view of the fact that such method and apparatus does not affect or alter the video signal information in any way and thus enables restoration of the television picture without change in the picture reception quality over that which would be obtained in unscrambled transmission and reception.

Other prior proposals involving related systems include that of U.S. Pat. No. 3,081,376 in which, however, it is necessary to employ a sine-wave signal that affects the video signal as well as the synchronizing signals; and the system of U.S. Pat. No. 3,184,537 that transmits the video signal all the time without the synchronizing signals and forbids the "tease" effect of a scrambled picture.

Though the invention will be hereinafter described in connection with its important application to television systems, moreover, it is to be understood that it is equally applicable to other types of signal transmission systems wherein the same advantages and functions are desired.

As disclosed in the said Blonder Letters Patent, the synchronizing signals depressed to substantially blanking level (8db suppression being currently considered optimum) for the purposes of the repetitive scrambling, may be either or both of the vertical and horizontal synchronizing signals. Where the horizontal synchronizing signals are thus acted upon to effect scrambling, however, a certain degree of phase jitter or timing error or noise on the pilot tone during weak signal conditions may in some instances be introduced as a result of the fact that the pilot tone, used as a sine-wave modulation of the aural or audio carrier, is of substantially the same frequency as that of the horizontal synchronizing pulses transmitted in the composite radio-frequency transmission; namely, about 15.734 KHz. The phase relationship between the pilot tone and horizontal sync must be precisely maintained.

It is an object of the present invention, accordingly, to provide improved insurance against such possibility of phase jitter and to insure a complete separation at the receiver of these two signals of substantially the same frequency; it being thus an object of the present invention to provide a new and improved apparatus for television or related transmission decoding that employs such novel interference-prevention techniques and apparatus.

A further object of the invention is to provide a new and improved apparatus for decoded reception for over-the-air and cable subscription television and the like.

Still a further object is to provide such a novel decoding technique and apparatus operable, at will, in any of vertical sync depressed-level scrambling, vertical and continual horizontal sync depressed-level scrambling, and vertical and horizontal scrambling at predetermined rates, such as the before-mentioned 10HZ, more or less.

Other and further objects will be explained hereinafter and are more particularly delineated in the appended claims.

In summary, the setting of the invention is in a system for decoding radio-frequency broadcasted scrambled television transmissions containing a modulation-suppressed train of horizontal synchronizing signals at a predetermined line rate and including equalizing pulses, vertical synchronizing signals periodically modulation-suppressed at reference equalizing signals in the horizontal synchronizing signal train within an encoded video carrier signal, a modulation frequency signal corresponding to that used for the suppression modulation but advanced in time, and a pilot signal of frequency substantially the same as that or a multiple of the horizontal synchronizing signal line rate. A preferred system embodies apparatus having, in combination, means for receiving as radio-frequency signals said transmissions including said video carrier containing modulation-suppressed horizontal and vertical synchronizing signals, said advanced modulation frequency signal and said pilot signal; means connected to said receiving means for demodulating said pilot signal independently of and isolated from said video carrier containing said suppressed horizontal synchronizing signals; further demodulating means connected to said receiving means for recovering said advanced modulation frequency signal; means connected with the first-named demodulating means for adjusting the phase of the demodulated pilot signal to synchronize the same with the periods of the suppressed horizontal synchronizing signals; synchronizing signal separating means connected with said receiving means and connected to be keyed by said demodulated pilot signal to separate out said horizontal synchronizing signals including said reference equalizing pulses; means connected to the separating means for selecting the reference equalizing pulse; means connected with the said selecting means and responsive to the selected reference equalizing pulse for generating the signal corresponding to the vertical synchronizing signal suppression modulation; synchronizer means connected to said generating means and to said further demodulating means to produce an advanced modulation frequency signal synchronized with the said reference equalizing pulse; address gating circuit means connected to each of said synchronizer means, said generating means and said demodulated pilot signal adjusting means to produce decoding pulses corresponding to both the vertical and horizontal suppression modulations; and radio-frequency voltage-controlled attenuator modulation means connected in the input of said receiving means and connected with said address gating circuit means to restore the suppressed vertical and horizontal synchronizing signals, thereby to restore an unscrambled television transmission. Modifications and preferred details are hereinafter set forth.

The invention will now be described in connection with the accompanying drawing, FIG. 1, of which is a schematic block and circuit diagram illustrating the invention in preferred form; and FIGS. 2A–G present a series of waveform diagrams explanatory of the operation of the system of FIG. 1 and illustrating various waveforms at different parts of the system thereof.

Specifically, in the system of the said Blonder Letters Patent, the decoding restoration of the transmitted attenuated or depressed scrambling of synchronizing (sync) pulses is achieved following the amplification of the received transmission. This is admirably suited for operation involving the scrambling of the periodic vertical synchronizing impulses at predetermined rates, such as the 10HZ before discussed. As above explained, however, since the pilot tone is preferably selected at the same frequency as the horizontal sync impulses, when the horizontal sync impulses are also to be used in the scrambling process at a rate of about 10HZ, the problems of phase jitter or cross-talk or the like between the same and the pilot tone must be guarded against; such that it is preferred, as in accordance with the present invention, that the RF gating or attenuation or modulating restoration at the decoder be effected in advance of the amplification in the received channel. If there is low-frequency modulation of the horizontal sync signal for scrambling purposes, moreover, it is important not to use any amplifying circuits with automatic gain control in advance of the before-mentioned RF gating, since the 10HZ or other modulation of the horizontal sync impulses will disturb the automatic gain control circuit, rendering recovery of the picture signal difficult if not impossible without the production of an undesired 10HZ or other modulation flashing effect on the screen as a result of cross-talk, so introduced. It is therefore a requirement that an independent source of recovery of the 10HZ or other low-frequency modulation be obtained apart from the horizontal sync, in order to enable such decoding in the receiving circuit.

Referring to FIG. 1, a broadcasted television signal (illustrated as UHF Channel 68) is shown fed from the ANTENNA, so-labelled, to a converter module externally labelled 1 and internally 100, for converting the signal to, for example, VHF Channel 3. The converter 1 contains a UHF Channel 68 band pass filter (BPF) feeding mixer together with a local oscillator comprising a crystal oscillator multiplier chain (as at 734 MHz) to generate the VHF Channel 3 frequency (65.75 MHz) in the PRE-AMP. This converted signal is fed into the Channel 3 AMPLIFIER 3 (internally numbered 300) consisting of the following: a bandpass amplifier (BP AMP) with keyed AGC feeding an RF gate for purposes of scramble restoration, and in turn feeding a bandpass amplifier (BP AMP) that connects to a video detector and AGC circuits, so-labelled, that provide input for a keyed horizontal sync separator (HOR. SYNC.) and a keyed horizontal trailing edge sync separator. The logical outputs from and interfaces to this module 3 interrelate with the picture decoder 5 (or 500) and the aural demultiplexer 4 (or 400), as later explained.

An RF signal derived from the channel 3 amplifier 3 also feeds via 13' the aural receiver externally numbered 2, and internally, 200. That receiver 2 essentially contains an FM receiver that converts the channel 3 aural carrier by means of a balanced mixer and crystal oscillator (labelled 76.45 mHz XTAL OSC.) to a standard 10.7 MHZ, IF., which consists of suitable limiters, bandpass filter (BPF) and a discriminator, all labelled within block 200. The output of the aural receiver, therefore, is a composite baseband covering a spectrum of 50 Hz to 46.5 KHz and this composite spectrum is fed at 2' into the aural demultiplexer 4 consisting within the block 400 of a common input amplifier AMP feeding four paths of signal processing. These paths are (1) an active bandpass filter (BPF) for extraction of pilot tone information at 15.734 KHz, independent of and isolated from the video carrier and the suppressed horizontal sync signals thereof; (2) an upper sideband filter (USB) for processing the scrambled program sound; (3) a direct output of barker information; and (4) a channel at 23.6 KHz which includes billing and some control information. The prime function of the aural demultiplexer 4, therefore, is to provide recovered audio and recovered control information for restoration of the scrambled video. To do this, the aural demultiplexer uses a phase-lock loop (PLL) associated with the independent extraction of the transmitted pilot tone to establish a very stable regenerated pilot tone which, through an 8 microsecond shaping and squaring circuit, so-labelled, provides a demodulated pilot signal keying output via 4' through the keyed AGC amplifiers in the Channel 3 amplifier module 3, and also via 4" a strobe pulse which feeds the picture decoder module 5 and is used in conjunction with the vertical window synthesizer contained within block 500 thereof, labelled VERT. WINDOW SYNTHESIZER. The phase-lock loop demodulated pilot signal (at PLL) is also squared, as indicated ("SQAURE WAVE"), for controlling this trailing edge separator output.

The fundamental operation of the digital logic involved in the one-line memory feature of the invention is as follows. The before-mentioned video detector and AGC circuits of the amplifer 3 apply detected video signal at 3' to the previously mentioned HOR. SYNC. and HOR. TRAILING EDGE SYNC separators. The lower or keyed horizontal trailing edge sync separator allows extraction of the trailing edge time information of the transmitted horizontal sync pulse. That trailing edge information, during the time in which the said 8 microsecond (8 µs) keying pulse is provided at 3''', is compared and provides a clock input for the picture decoder 5. The HOR. TRAILING EDGE SYNC. INPUT is shown applied to a 1 µs MONO (adjustable at H-ADJ.) which feeds the 11.8 µs HORIZONTAL WINDOW SYNTHESIZER. The clock is a digitally derived count-down system which provides one line of memory. In effect, it will count the time from the trailing edge of one horizontal sync pulse to immediately before the start of the next horizontal sync pulse, one line later. In addition to providing this delay, the digitally derived window starting at this delay, and covering the entire width of the next horizontal sync pulse is thus generated. This is effectively of 11.8 microseconds width (11.8 μs), with nominal delay of 57 microseconds from the prior trailing edge. This new 11.8 microsecond window is now precisely centered on the next sync pulse that is to be expected from the RF transmission. Through additional logic at LOGIC GATES in block 500, unscramble DECODING LOGIC is addressed and fed back along 5' (DECODING LOGIC OUTPUT TTL) to the RF gate of the channel 3 amplifier module 3, effecting an 8db amplitude compensation, and thereby restoring the suppressed sync, horizontally and vertically, (where both scrambles are used), and providing the maximum margin of allowable jitter in the system due to noise, cross talk and other similar factors.

The vertical window is similarly synthesized from the upper keyed horizontal sync separator of module 3, which is also keyed at 5" by the 11.8 microsecond horizontal window and provides a continuous train of horizontal pulses which have been separated from the vertical sync. In the picture decoder 5 there is provided an equalizing pulse detector circuit, so-labelled (3.6 μs MONO) which recognizes the difference between an equalizing pulse and a normal horizontal pulse applied at 3" with the HOR. SYNC. INPUT. The first equalizing pulse defines the start of a new field. This information is used to set a set-reset flip-flop (S-R FF), and in conjunction with a digital count-down system of about 970 microseconds delay, generates, via an 11 ms MONO, the activation of the vertical window synthesizer. This is logically combined with the horizontal window synthesizer output in the LOGIC GATES, as before intimated, addressed and applied to the RF gate of module 3 for effective vertical and horizontal descrambling.

In addition, through the 23.6 KHz bandpass section of the aural demultiplexer 4, labelled 23.6 KHz BPF, there is derived 10 Hz advanced modulation frequency signal coding information, logically applied at 4''' to the logic gates of the picture decoder 5 such that the necessary selection of the vertical window occurs in a three-on, three-off manner hereinafter described. Other outputs of 4 also feed a billing decoder 6 for ultimate motor-driven printer accounting; but since this forms no part of the window concept underlying the present invention, such structure is not described in detail herein other than to label operational blocks thereof in the drawing.

The operational sequence of the system of FIG. 1 is illustrated in the waveforms of the horizontal sync decoding timing diagram of FIGS. 2A–G. FIG. 2A represents the encoded channel 3 visual carrier input to the RF gate of amplifier module 3, as recovered through the front end converter 1 and IF strip. This shows that the horizontal sync region is suppressed or depressed from normal in a window of approximately 13 microseconds (1.25 μs) initially, then 10.5 μs including the time of the color burst, and then a terminal 1.25 μs).

In FIG. 2B, the recovered pilot tone out of the phase-lock loop PLL (FIG. 1, block 400 of the aural demultiplexer 4) is shown in its timing relationship with the encoded visual carrier sync waveform of FIG. 2A.

FIG. 2C shows the 8 microsecond input at 4' to the horizontal trailing edge sync separator of the channel 3 module 3, illustrating that this 8 microsecond pulse is precisely centered at the trailing edge of the depressed horizontal sync of FIG. 2A.

FIG. 2D shows the output of 3''' of the horizontal trailing edge sync separator as used to trigger the countdown logic in the picture decoder 5, generating the one-line delay for the 11.8 microsecond horizontal window; and this effectively is illustrated in FIG. 2E wherein the output of the one-line memory is depicted.

FIG. 2F shows the waveform of the output of the 11.8 microseconds horizontal window decoding pulse at 5'.

Figure 1:
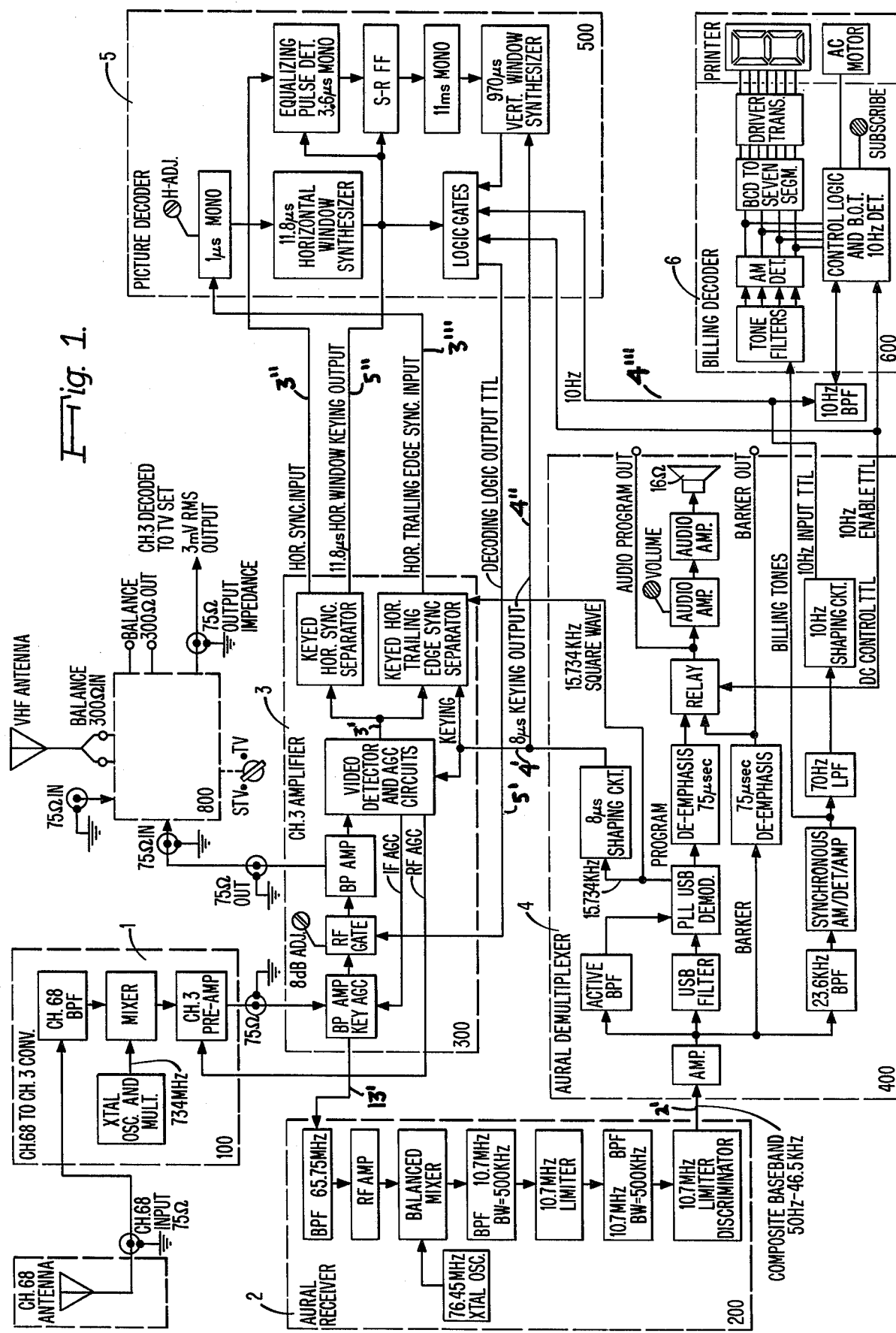

FIG. 2G, lastly, illustrates the effect of the RF gate in the module 3 receiving the decode command of FIG. 2F via 5', and causing the suppressed sync of FIG. 2A to be restored to the normal amplitude relative to blanking and the balance of video. In addition, one can observe in FIG. 2G, immediately before and after the sync interval, approximately ¾ microsecond guard-band suppressions. These provide some residual noise immunity and prevent an accidental generation of spurious effects due to very minute but residual jitter in the recovered information.

While a suitable circuit structure for generating the one-line delay window systems of the invention has been described (and other well-known circuits may also be employed) it is in order further to discuss the important advantages that inure through the use of this technique of indirect synthesis by first incorporating a trailing edge separator and then a one-line memory. The 8 microsecond sampling pulse being centered on a trailing edge of the encoded visual carrier envelope provides an allowable 4 microseconds worth of jitter (FIG. 2C) on that 8 microsecond pulse stability before the trailing edge is no longer discernable in terms of the output of the horizontal trailing edge sync separator. Since, therefore, the 8 microseconds is directly derived from the phase-lock loop (PLL), a permissible maximum drift of + or − 4 microseconds is available, providing an advantage of greater than 5:1 over the use of the pilot tone with an independent window.

Further modifications will also occur to those skilled in this art and all such are considered to fall within the spirit and scope of the invention as defined in the appended claims.

What is claimed is:

1. In a system for decoding radio-frequency broadcasted scrambled television transmissions containing a modulation-suppressed train of horizontal synchronizing signals within a predetermined time window and at a predetermined line rate and including equalizing pulses, vetical synchronizing signals periodically modulation-suppressed at reference equalizing signals in the horizontal synchronizing signal train within an encoded video carrier signal, a modulation frequency signal corresponding to that used for the suppression modulation but advanced in time, and a pilot signal of frequency substantially the same as that or a multiple of the horizontal synchronizing signal line rate; apparatus having, in combination, means for receiving as radio-frequency signals said transmissions; radio-frequency gating means connected with the receiving means to receive said transmissions; video detector means connected to said radio-frequency gating means to demodulate said video carrier containing modulation-suppressed horizontal and vertical synchronizing signals; horizontal synchronizing signal and horizontal trailing edge synchronzing signal separator means connected with said video detector means; aural demodulation means connected to said receiving means for demodulating said pilot signal independently of and isolated from said video detector means and for recovering said advanced modulation frequency signal; means connected with the pilot signal demodulating means for controlling the said horizontal trailing edge synchronizing signal separator means in response to said demodulated pilot signal and in response to the keying of a pulse of width less than said window substantially centered at the trailing edge of the suppressed horizontal synchronizing signal; picture decoder means comprising means responsive to the outputs of the horizontal synchronizing signal separator means and the horizontal trailing edge synchronizing signal separator means for generating a delay for the said horizontal synchronizing signal window of a horizontal line and thereby providing a horizontal window decoding pulse; and means for applying said horizontal window decoding pulse to said radio-frequency gating means to restore the suppressed synchronizing signals, thereby to restore an unscrambled television transmission.

2. Apparatus as claimed in claim 1 and in which said modulation frequency is about 10 HZ and the means for demodulating the pilot signal applied to said horizontal trailing edge synchronizing separator means includes phase lock loop means; means for stabilizing and squaring said demodulated pilot signal.

3. Apparatus as claimed in claim 1 and in which said reference equalizing pulse is selected as the first of the equalizing pulses in the horizontal synchronizing signal train at the said horizontal line rate.

4. Apparatus as claimed in claim 1 and in which said vertical synchronizing modulation signal generating means is responsive to the trailing edge of said reference equalizing pulse.

5. Apparatus as claimed in claim 1 and in which said picture decoder means comprises equalizing pulse detecting means responsive to the pulse width of the equalizing signals as distinguished from wider horizontal and vertical synchronizing signals.

6. Apparatus as claimed in claim 1 and in which said horizontal synchronizing signal line rate and the pilot signal frequency are each adjusted to about 15.734 KHz, the said vertical synchronizing signal rate is adjusted to about 60 HZ, the said suppression modulation signal frequency is set at about 10 HZ, the width of the vertical synchronizing signal suppression modulation pulse is adjusted to at least about several hundred microseconds, and the width of the horizontal synchronizing signal suppression modulation pulse is set at least about ten microseconds.

7. Apparatus as claimed in claim 1 and in which said picture decoder means comprises count-down logic means for generating said line delay.

8. Apparatus as claimed in claim 1 and in which said window is of substantially 11.8 microseconds width and said keying pulse is of substantially 8 microseconds width.

9. Apparatus as claimed in claim 1 and in which said picture encoder means comprises a decoding logic gate output means and a mono circuit means responsive to the horizontal trailing edge synchronizing separator output and connected to horizontal window synthesizer means for applying an output to said logic gate means.

10. Apparatus as claimed in claim 9 and in which said picture encoder means further comprises equalizing pulse detector means responsive to the outputs of the said horizontal synchronizing signal separator means for controlling vertical window synthesizer means also feeding said logic gate means.

11. Apparatus as claimed in claim 10 and in which said logic gate means is connected to receive further inputs from said aural demodulator means in the form of 10 HZ reference signals.

12. Apparatus as claimed in claim 8 and which there is provided means for supplying guard-band suppression intervals immediately before and after the synchronizing signal interval.

* * * * *